United States Patent
Feng et al.

(10) Patent No.: US 8,472,170 B2
(45) Date of Patent: Jun. 25, 2013

(54) COMPUTER CHASSIS WITH ANTI-EMI LID FASTENING

(75) Inventors: Shi-Xuan Feng, Shenzhen (CN); Ze-Liang Xie, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 196 days.

(21) Appl. No.: 13/195,005

(22) Filed: Aug. 1, 2011

(65) Prior Publication Data

US 2012/0293933 A1 Nov. 22, 2012

(30) Foreign Application Priority Data

May 16, 2011 (CN) .......................... 2011 1 0125272

(51) Int. Cl.
*G06F 1/16* (2006.01)
(52) U.S. Cl.
USPC ................ 361/679.02; 248/206.5; 312/332.1; 165/104.33; 439/890
(58) Field of Classification Search
USPC ................ 439/890, 76.1, 39, 92, 66, 541.5, 439/260, 595; 361/818, 714, 800, 679.57, 361/679.58, 679.22, 679.6, 679.5, 579.02, 361/679.36, 679.49, 679.32, 679.33, 679.04; 248/220.21, 118, 317, 295.11, 442.4, 201, 248/206.5; 312/223.2, 350, 348.4, 237, 258, 312/265.6, 334.4, 332.1, 244; 165/80.4, 121, 165/185, 46, 80.3, 170, 104.33, 104.26, 11.1, 165/174
See application file for complete search history.

(56) References Cited

U.S. PATENT DOCUMENTS

| | | | | |
|---|---|---|---|---|
| 6,816,391 B2 * | 11/2004 | Davis et al. | .................... | 361/818 |
| 2007/0253155 A1 * | 11/2007 | Cheng et al. | .................. | 361/683 |

* cited by examiner

*Primary Examiner* — Hung Duong
(74) *Attorney, Agent, or Firm* — Altis Law Group, Inc.

(57) ABSTRACT

An exemplary computer chassis includes a casing and a lid covering the casing. The casing includes a bottom wall, a first sidewall and second sidewall extending from the bottom wall, the first sidewall and the second sidewall each extending a curved engaging ledge. The lid includes a main body and baffles extending from the main body. The baffles fittedly engage with corresponding engaging ledges of the first sidewall and the second sidewall of the casing.

20 Claims, 8 Drawing Sheets

COMPUTER CHASSIS WITH ANTI-EMI LID FASTENING

BACKGROUND

1. Technical Field

The present disclosure relates to computer chassis, and more particularly relates to a computer chassis with capability to suppress electromagnetic interference (EMI).

2. Description of Related Art

A chassis is a necessary part of a computer such as a personal computer, for supporting and protecting electronic components of the computer. In a typical computer chassis, a lid is directly engaged with a casing by welding, or is detachably engaged with a casing by any of various mechanical means. When the engagement is a detachable engagement, this may be by way of a simple single-side contact at joints of the lid and the casing. Alternatively, bulges arranged in a line may be provided on the lid or the casing to improve the engagement therebetween. In still other arrangements, there may be multiple bulges provided in non-linear arrays.

In use of the computer, electronic components on high-frequency circuits produce electromagnetic waves. No matter how the lid is engaged with the casing, the electromagnetic waves can easily leak out of the computer chassis via the joint(s) where the lid engages with the casing. That is, the electromagnetic waves may unavoidably radiate out of the computer. Such electromagnetic waves are liable to cause electromagnetic interference in other nearby electronic devices. In particular, sensitive electronic devices near the computer may malfunction.

What is needed, therefore, is a computer chassis which can overcome the above-described problems.

BRIEF DESCRIPTION OF THE DRAWINGS

Many aspects of the present computer chassis can be better understood with reference to the following drawings. The components in the drawings are not necessarily drawn to scale, the emphasis instead being placed upon clearly illustrating the principles of the present computer chassis. Moreover, in the drawings, like reference numerals designate corresponding parts throughout the several views.

DETAILED DESCRIPTION

Figure 1:
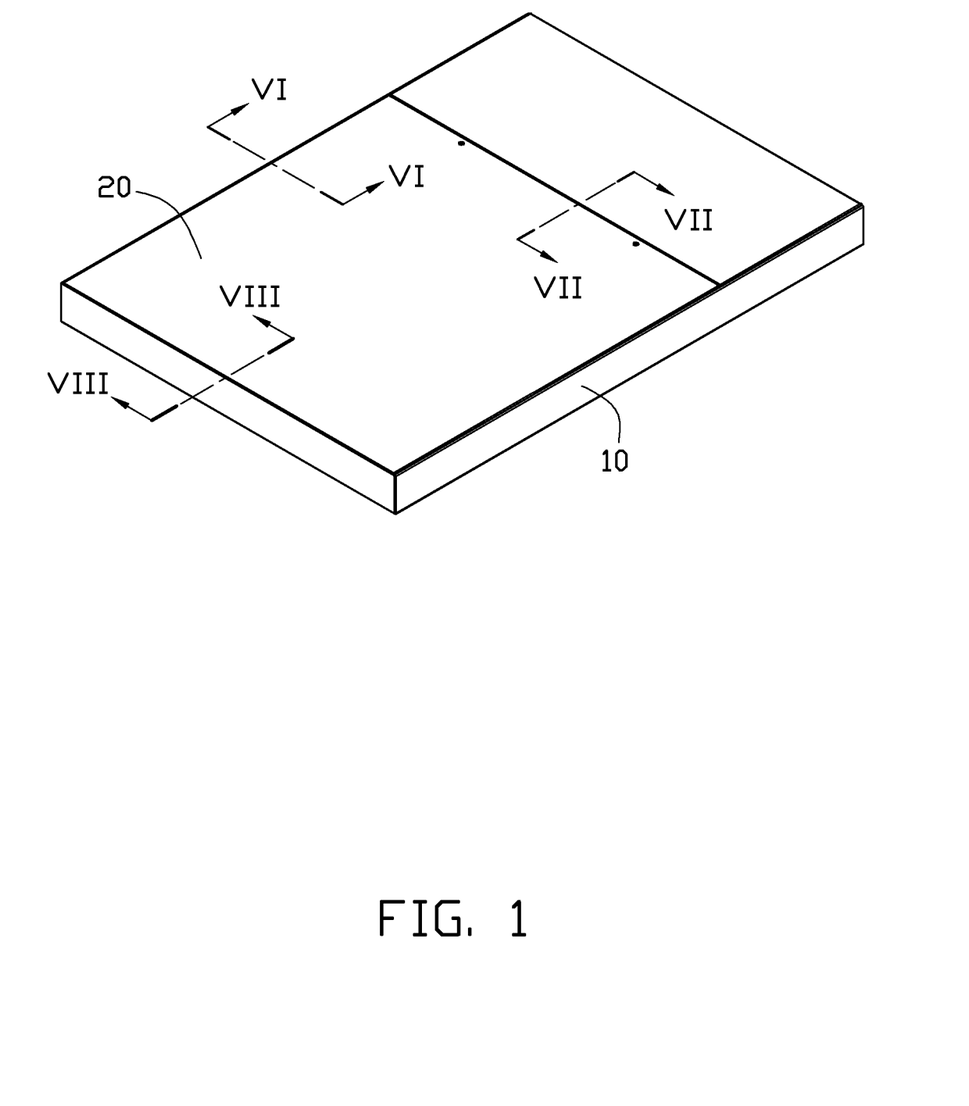
FIG. 1 is an assembled, isometric view of a computer chassis in accordance with an exemplary embodiment of the disclosure.
Figure 2:
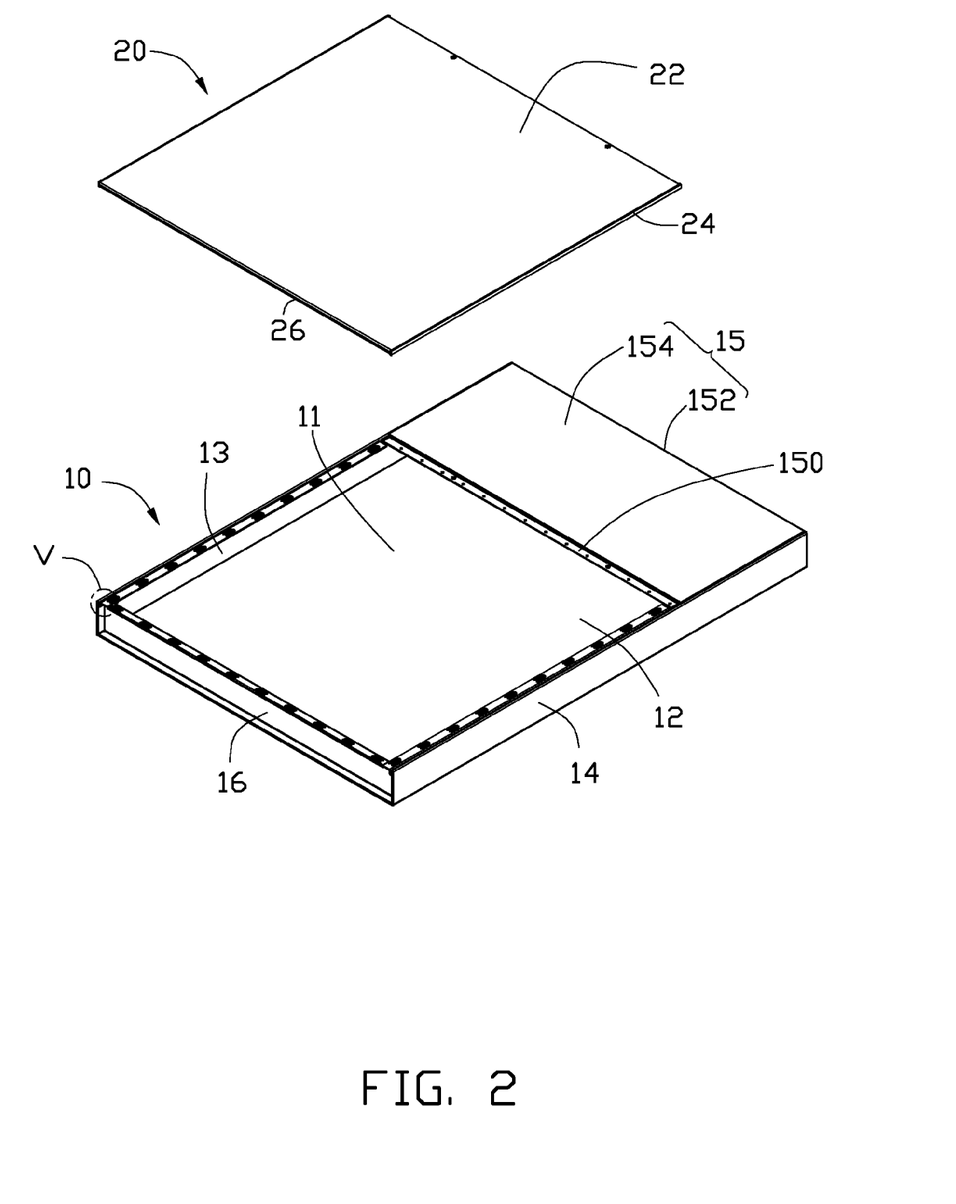
FIG. 2 is an exploded view of the computer chassis of FIG. 1.
Figure 3:
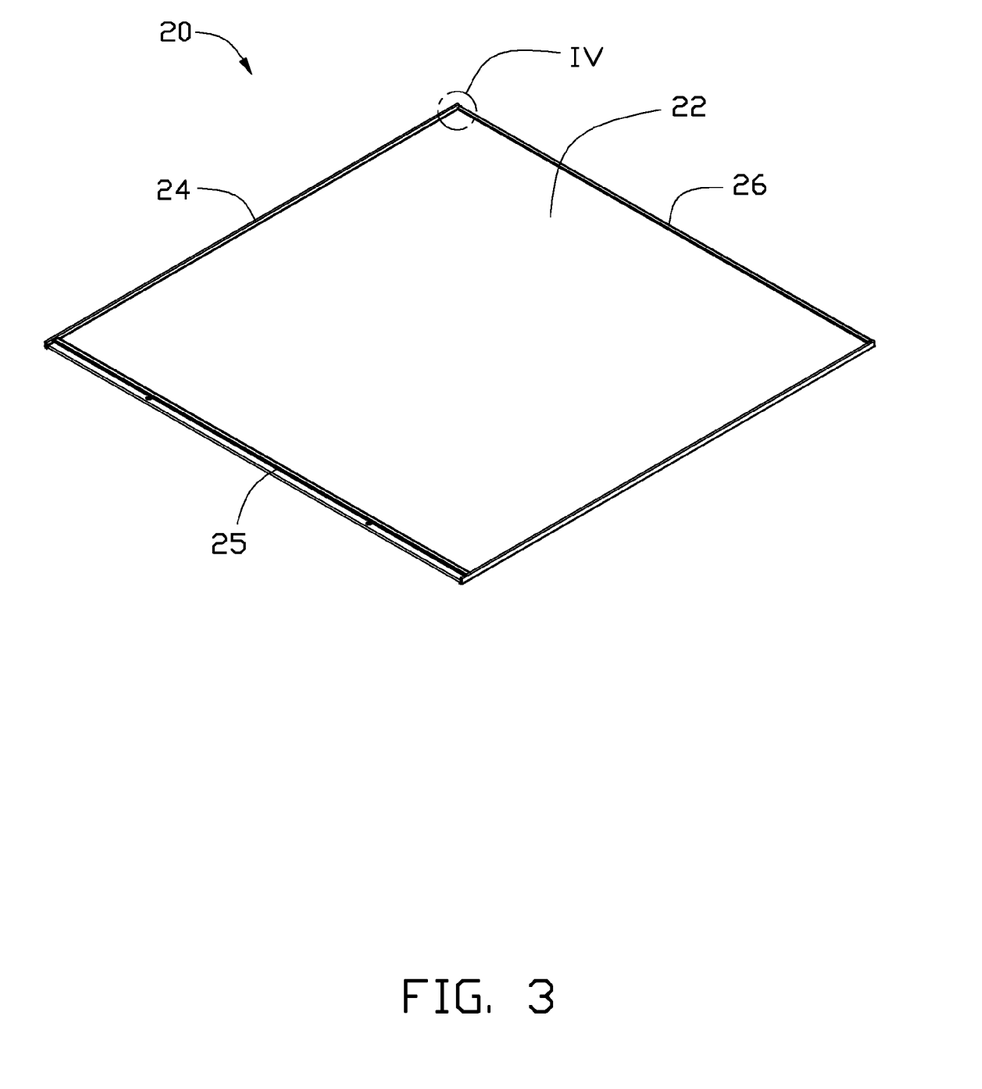
FIG. 3 is an isometric view of a lid of the computer chassis of FIG. 2, but showing the lid inverted.
Figure 4:
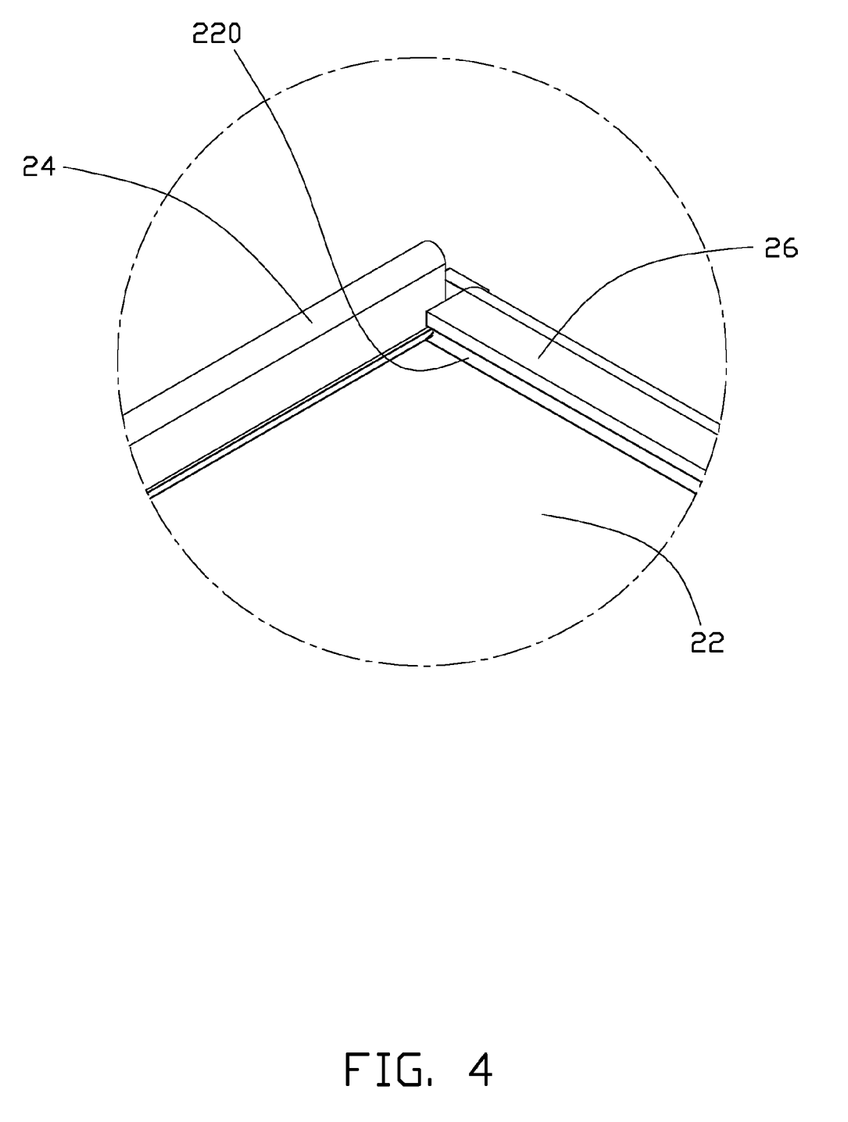
FIG. 4 is an enlarged view of a circled portion IV of the lid of FIG. 3.

Referring to FIGS. 1 and 2, a computer chassis of an exemplary embodiment of the present disclosure is illustrated. The computer chassis comprises a casing 10, and a lid 20 covering the casing 10. The casing 10 is a hollow housing. In this embodiment, the casing 10 has a cuboid configuration. The casing 10 comprises a bottom wall 11, and four interconnecting sidewalls extending from four corresponding sides of the bottom wall 11. The sidewalls of the casing 10 comprise a first sidewall 13, a second sidewall 14 opposite to the first sidewall 13, a third sidewall 15 connecting corresponding ends of the first sidewall 13 and the second sidewall 14, and a fourth sidewall 16 opposite to the third sidewall 15 and connecting corresponding other ends of the first sidewall 13 and the second sidewall 14. The bottom wall 11 and the sidewalls 13, 14, 15, 16 cooperatively define a space for accommodating electronic components therein, and define an opening 12 facing towards the lid 20.

Figure 6:
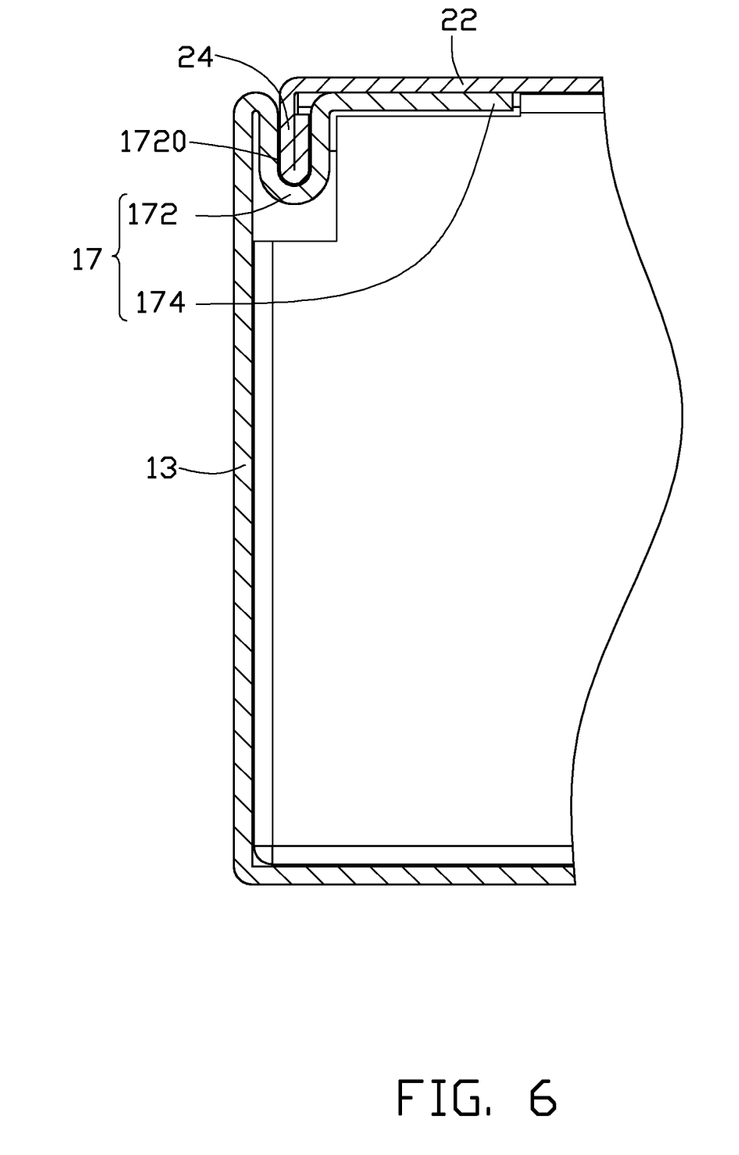
FIG. 6 is an enlarged, sectional view of the computer chassis of FIG. 1, taken along line VI-VI thereof.

Referring to FIGS. 3-4 and 6-8 also, the lid 20 comprises a main body 22, two baffles 24, and a first flange 25 and a second flange 26 extending from the main body 22. The baffles 24, the first flange 25 and the second flange 26 all extend toward the casing 10. In this embodiment, the main body 22 is a rectangular plate. The two baffles 24 extend from two opposite sides of the main body 22, and face each other. Each of the two baffles 24 extends along the whole of a corresponding side of the main body 22. Each of the two baffles 24 has a folded structure, which comprises a first part integrally and perpendicularly extending away from the main body 22 and a second part bending from the first part and extending toward the main body 22. Thus, each of the two baffles 24 has a double-plated configuration, as seen in FIG. 6.

Figure 7:
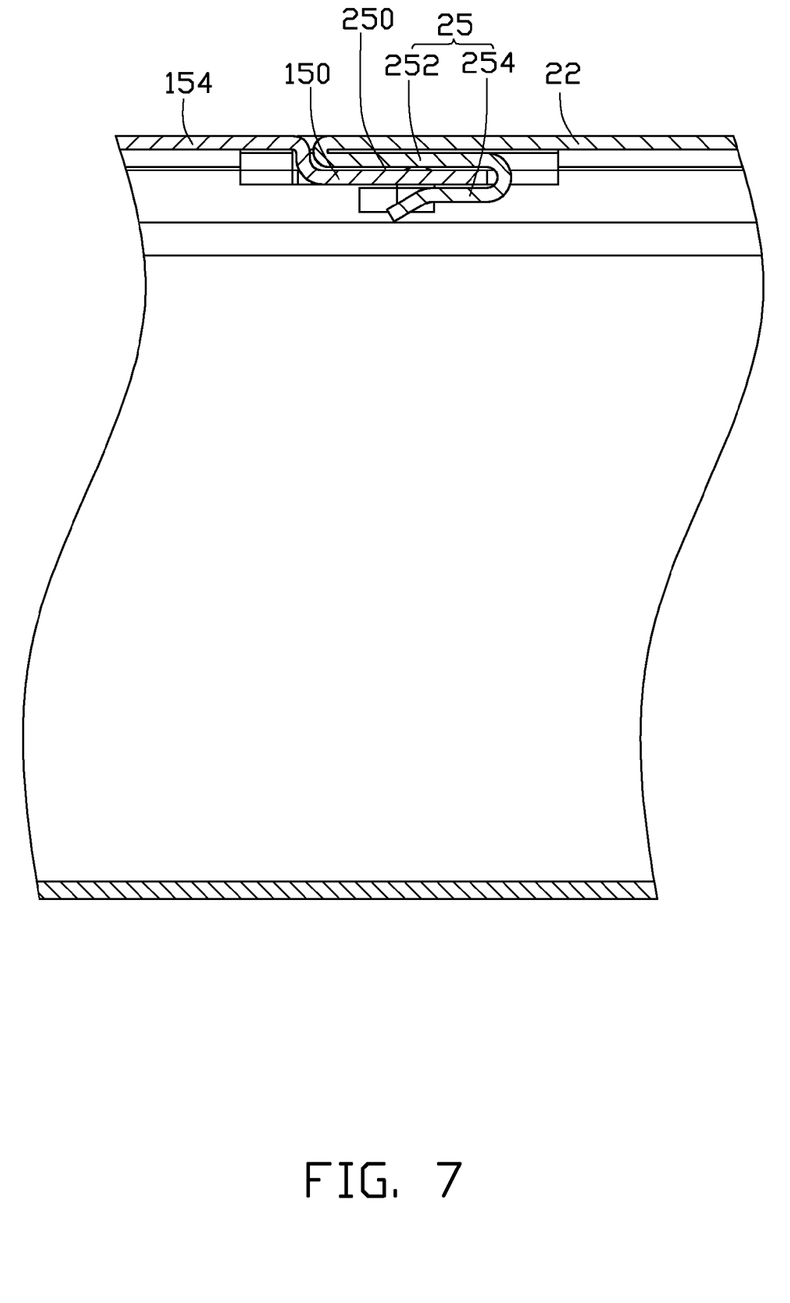
FIG. 7 an enlarged, sectional view of the computer chassis of FIG. 1, taken along line VII-VII thereof.
Figure 8:
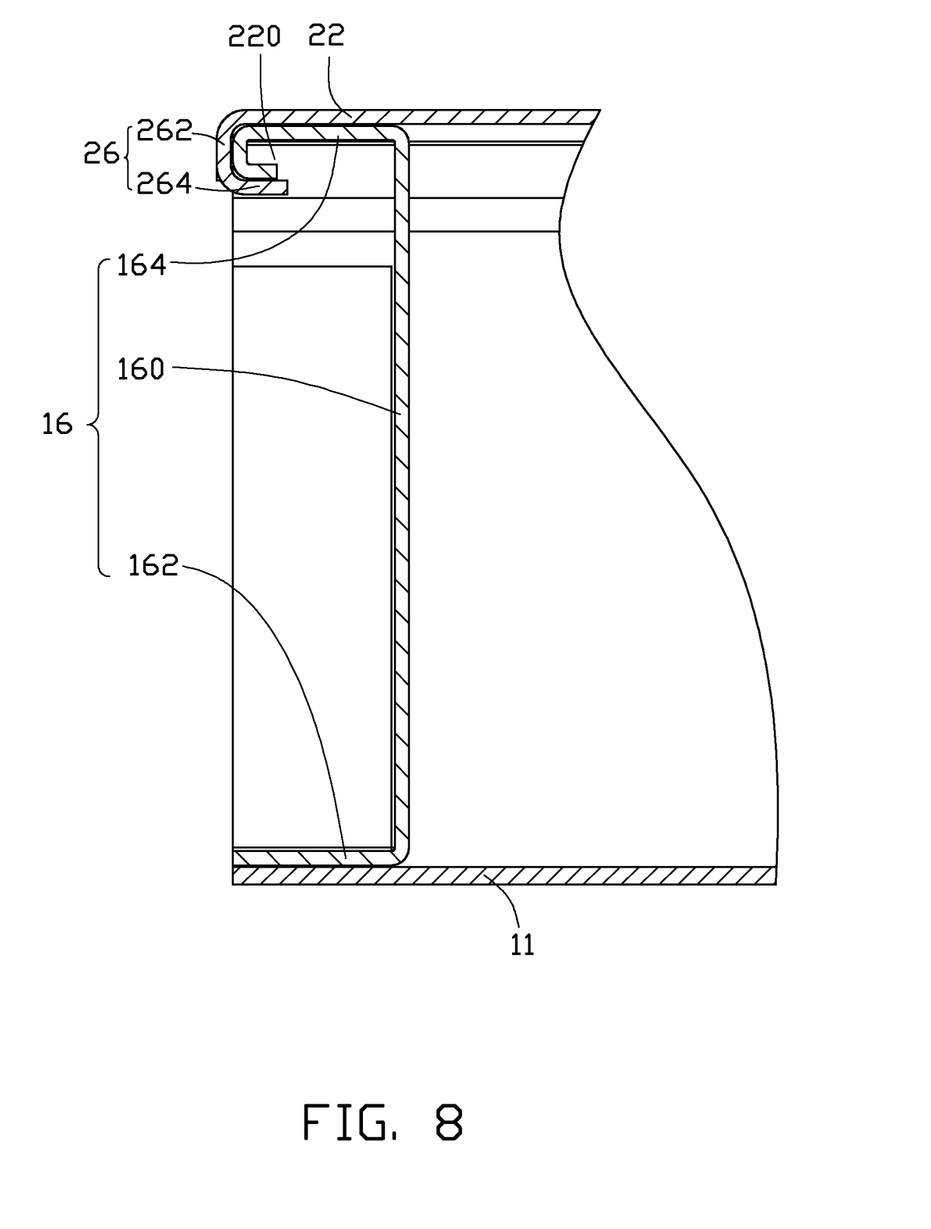
FIG. 8 an enlarged, sectional view of the computer chassis of FIG. 1, taken along line VIII-VIII thereof.

The first flange 25 and the second flange 26 extend from another two opposite sides of the main body 22, and face each other. The first flange 25 extends along the whole of a corresponding side of the main body 22. The first flange 25 is curved, and comprises a first part 252 bending from and parallel to the main body 22 and a second part 254 bending from and parallel to the first part. Thus, the first flange 25 has a U-shaped configuration, with an opening facing away from the second flange 26, as seen in FIG. 7. A first accommodation room 250 is defined between the first part 252 and the second part 254 of the first flange 25. A distal end of the second part 254 of the first flange 25 is oriented slantwise away from the first part 252 of the first flange 25. The second flange 26 extends along the whole of a corresponding side of the main body 22. The second flange 26 is curved, and comprises a first part 262 integrally perpendicularly extending away from the main body 22 and a second part 264 perpendicularly extending from the first part 262 and parallel to the main body 22. Thus, the second flange 26 and a corresponding part of the main body 22 cooperatively form a U-shaped configuration, with an opening facing toward the first flange 25, as seen in FIG. 8. A second accommodation room 220 is defined between the main body 22 and the second flange 26.

Figure 5:
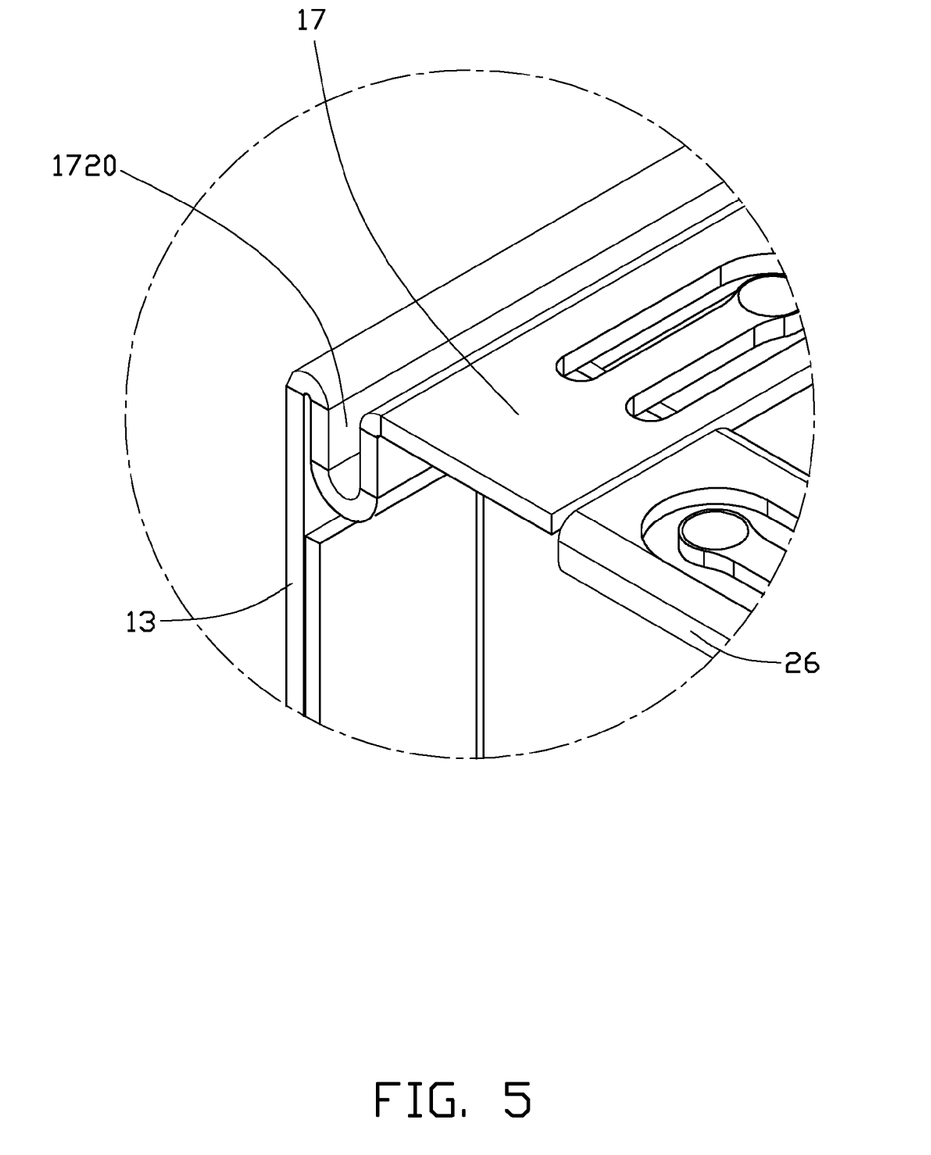
FIG. 5 is an enlarged view of a circled portion V of the computer chassis of FIG. 2.

Referring to FIGS. 5 and 6, the first sidewall 13 and the second sidewall 14 of the casing 10 each form an engaging ledge 17 at a top end thereof. The engaging ledge 17 is curved, and comprises a positioning part 172 and a supporting part 174 extending from the positioning part 172. The positioning part 172 is adjacent and essentially parallel to the first sidewall 13. The positioning part 172 is curved to define an elongated groove 1720, corresponding to one of the baffles 24 of the lid 20. The groove 1720 has a size substantially the same as the baffle 24.

Referring to FIGS. 2 and 7, the third sidewall 15 comprises a wall part 152 perpendicular to the bottom wall 11 and opposite to the fourth sidewall 16, and a covering part 154 parallel to the bottom wall 11 and covering a part of the space for accommodating the electronic components. A free end of the covering part 154 of the third sidewall 15 is bent downwardly and then horizontally to form a step 150. The step 150 is for supporting the lid 20, and engaging in the first accommodation room 250 of the first flange 25 of the lid 20.

Referring to FIG. 8, the fourth sidewall 16 comprises a base part 162, an engaging part 164, and a connecting part 160 connecting the base part 162 and the engaging part 164. The base part 162, the engaging part 164 and the connecting part 160 cooperatively form a generally U-shaped configuration. The base part 162 extends from and is parallel to the bottom wall 11. The connecting part 160 extends from the base part 162, and is vertical to the base part 162 and the bottom wall 11. The engaging part 164 is curved, and comprises a main portion perpendicular to the connecting part 160 and an end portion bent from and parallel to the main portion. In this embodiment, the engaging part 164 is configured to fit in the second accommodation room 220 defined by the second flange 26 and main body 22 of the lid 20. The main portion of the engaging part 164 of the fourth sidewall 16 is substantially coplanar with the step 150 of the third sidewall 15, and is for supporting the lid 20.

Referring to FIGS. 1 and 6-8, in assembly of the computer chassis, the lid 20 covers the casing 10 and seals the opening 12 of the casing 10. The two baffles 24 of the lid 20 are fittedly and detachably engaged with the positioning parts 172 of the engaging ledges 17, by being received in the corresponding grooves 1720 of the first sidewall 13 and the second sidewall 14 of the casing 10. The supporting parts 174 of the engaging ledges 17 support the main body 22 of the lid 20. The first flange 25 of the lid 20 has the first part 252 thereof positioned on the step 150 of the third sidewall 15, with the step 150 engagingly received in the first accommodation room 250 of the first flange 25. That is, the step 150 is sandwiched between the first part 252 and the second part 254 of the first flange 25. The engaging part 164 of the fourth sidewall 16 is engagingly received in the second accommodation room 220 of the second flange 26 and main body 22 of the lid 20.

Unlike with conventional computer chassis, the present computer chassis described above provides multi-aspect contact at joints of the lid 20 and the casing 10. In other words, the total amount of contact area as between the lid 20 and the casing 10 is enlarged. Therefore, electromagnetic waves generated by the electronic components in the computer are blocked by the computer chassis even at the joints of the lid 20 and the casing 10. Accordingly, electromagnetic interference caused to electronic devices near the computer is eliminated or at least attenuated.

It is to be understood, however, that even though numerous characteristics and advantages of the present embodiment(s) have been set forth in the foregoing description, together with details of the structures and functions of the embodiment(s), the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A computer chassis comprising:
a hollow casing, comprising a bottom wall, and a first sidewall and a second sidewall extending from opposite sides of the bottom wall, each of the first sidewall and the second sidewall having a curved engaging ledge extending from a top end thereof; and
a lid covering the casing, the lid comprising a main body and a pair of baffles extending down from opposite sides of the main body, the baffles fittedly and detachably engaging with the corresponding engaging ledges of the first sidewall and the second sidewall of the casing.

2. The computer chassis of claim 1, wherein each of the engaging ledges of the first sidewall and the second sidewall is curved to define a groove receiving a corresponding baffle therein.

3. The computer chassis of claim 2, wherein each of the baffles of the lid has a double-plated configuration.

4. The computer chassis of claim 2, wherein each of the engaging ledges of the first sidewall and the second sidewall of the casing comprises a positioning part defining the groove therein, and a supporting part extending from the positioning part and supporting the main body of the lid.

5. The computer chassis of claim 1, wherein the casing further comprises a third wall connecting the first sidewall and the second sidewall, the third sidewall comprising a step extending therefrom, the lid further comprising a first flange extending from the main body, and the step engaging with and supporting the first flange.

6. The computer chassis of claim 5, wherein the first flange of the lid is curved, the first flange comprising a first part bending from the main body and positioned on the step of the third sidewall of the casing, and a second part bending from the first part, and the step being sandwiched between the first part and the second part of the first flange.

7. The computer chassis of claim 5, wherein the third sidewall comprises a wall part and a covering part covering a part of the casing, and the step extends from the covering part.

8. The computer chassis of claim 5, wherein the casing further comprises a fourth sidewall connecting the first sidewall and the second sidewall, the fourth sidewall being opposite to the third sidewall of the casing.

9. The computer chassis of claim 8, wherein the lid further comprises a second flange opposite to the first flange, the fourth sidewall of the casing comprises an engaging part extending therefrom, and the engaging part engages with the second flange.

10. The computer chassis of claim 9, wherein the second flange of the lid is curved, and the main body and the second flange cooperatively define an accommodation room engagingly receiving the engaging part of the fourth sidewall of the casing therein.

11. The computer chassis of claim 10, wherein the second flange of the lid and the main body cooperatively form a U-shaped configuration.

12. A computer chassis comprising:
a casing comprising a bottom wall and four interconnecting sidewalls extending up from the bottom wall, the casing defining a top opening, the four sidewalls comprising a first sidewall, a second sidewall, a third sidewall and a fourth sidewall, each of the first sidewall and the second sidewall having a curved engaging ledge extending from a top end thereof, the third sidewall having a step extending from a free end thereof, and the fourth sidewall having an engaging part extending from a top end thereof; and
a lid covering the casing and sealing the opening of the casing, the lid comprising a main body, two opposite baffles extending from the main body, and a first flange and an opposite second flange extending from the main body, each of the baffles engaging with a corresponding engaging ledge of the first sidewall and the second sidewall of the casing, the first flange engaging with the step of the third sidewall of the casing, and the second flange engaging with the engaging part of the fourth sidewall of the casing.

13. The computer chassis of claim 12, wherein the casing is a cubic hollow housing.

14. The computer chassis of claim 13, wherein the first sidewall is opposite to the second sidewall, and the third sidewall is opposite to the fourth sidewall.

15. The computer chassis of claim 14, wherein the engaging ledge is formed at a top end of each of the first sidewall and the second sidewall of the casing, and the engaging ledge is curved to define a groove for receiving a corresponding baffle of the lid therein.

16. The computer chassis of claim 14, wherein the third sidewall comprises a wall part opposite to the fourth sidewall and a covering part covering a part of the casing, and the step extends from the covering part.

17. The computer chassis of claim 16, wherein the first flange of the lid is curved to define a first accommodation room accommodating the step of the third sidewall of the casing therein.

18. The computer chassis of claim 14, wherein the second flange of the lid is curved, and the second flange and the main body of the lid cooperatively define a second accommodation room accommodating the engaging part of the fourth sidewall therein.

19. The computer chassis of claim 18, wherein the fourth sidewall of the casing comprises a base part locating on the bottom wall and a connecting part connecting the base part and the engaging part, and the connecting part being perpendicular to the bottom wall and the base part.

20. The computer chassis of claim 19, wherein the engaging part of the fourth sidewall of the casing contacts the second flange and the main body of the lid at three different faces.

* * * * *